US008571383B2

(12) United States Patent
Bauchot et al.

(10) Patent No.: US 8,571,383 B2
(45) Date of Patent: Oct. 29, 2013

(54) METHOD AND SYSTEM OF CIRCUMVENTING CONTENT FILTERS

(75) Inventors: Frederic Bauchot, Saint-Jeannet (FR); Joaquin Picon, St. Laurent du Var (FR); Pierre Secondo, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 12/855,155

(22) Filed: Aug. 12, 2010

(65) Prior Publication Data

US 2011/0064383 A1 Mar. 17, 2011

(30) Foreign Application Priority Data

Sep. 15, 2009 (EP) .................................... 09305854

(51) Int. Cl.
*H04N 9/80* (2006.01)
(52) U.S. Cl.
USPC .......................................................... 386/241
(58) Field of Classification Search
None
See application file for complete search history.

(56) References Cited

U.S. PATENT DOCUMENTS

| 5,774,170 | A | 6/1998 | Hite et al. | |
|---|---|---|---|---|
| 6,049,626 | A * | 4/2000 | Kim | 382/167 |
| 6,704,930 | B1 | 3/2004 | Eldering et al. | |
| 7,174,044 | B2 * | 2/2007 | Ding et al. | 382/210 |
| 2008/0159622 | A1 * | 7/2008 | Agnihotri et al. | 382/157 |
| 2009/0079760 | A1 * | 3/2009 | Tu et al. | 345/619 |
| 2009/0158140 | A1 * | 6/2009 | Bauchot et al. | 715/234 |
| 2010/0070996 | A1 * | 3/2010 | Liao et al. | 725/35 |
| 2012/0304049 | A1 * | 11/2012 | Yuan et al. | 715/234 |

* cited by examiner

*Primary Examiner* — Huy T Nguyen
(74) *Attorney, Agent, or Firm* — Andrea Bauer; Hoffman Warnick LLC (57) ABSTRACT

A method, computer program, and system for enabling remanence-based advertisement that is not likely to be blocked by adblockers. A method of converting a master image, such as an advertisement or a logo, into a master video, according to an embodiment, includes: dividing the master image into a plurality of sub-images; generating a plurality of video frames defining a master video, the video frames having dimensions of the master image; and inserting the plurality of sub-images into the plurality of video frames, such that a playing of the master video defined by the video frames visually renders the master image.

20 Claims, 10 Drawing Sheets

Prior art

METHOD AND SYSTEM OF CIRCUMVENTING CONTENT FILTERS

FIELD OF THE INVENTION

The present invention generally relates to data processing, and more particularly to systems and methods of circumventing content filters.

RELATED ART

The business model of many companies on the Internet depends on the display of advertisements on a client web browser. The rise of solutions for blocking or skipping such ads greatly endangers this mainstream source of revenue.

Image recognition techniques scan the content of web pages or videos and when an advertisement is identified, the appropriate content or part of content is removed. The advertisement never reaches the eyes of the target users.

The state of the art comprises many adblocking techniques for skipping or removing advertisements on digital devices. On the reverse side (i.e., secure the display of advertisements), it appears that there are very few efficient technical solutions available.

Aside from technical approaches, there are rather quite non-technical methods such as permission marketing, warning messages, etc.

To secure revenues streams, there is a need for a method of circumventing content filters.

SUMMARY OF THE INVENTION

In order to address these and other problems, the present invention converts an image into a video. The invention accordingly allows transformation of a static object (for example a part of a web page) into a dynamic object (for example a video or an animation).

With the invention, it is further possible to distribute parts of a master image over a plurality of frames, leveraging a display remanence effect. The division of the master image into sub-images can be performed in many ways (e.g., regular or irregular portions, random, etc.), with some particular divisions efficiently defeating content filters. The distribution of the sub-images over video frames can also be performed in many ways (e.g., some video frames containing one or a plurality of sub-images, some containing none, etc.).

Further, the invention makes it possible to defeat content filters, provided with image recognition or filtering capabilities. In particular, with the invention, most existing image recognition technologies (which technologies could possibly be used to block or skip advertisements) and most existing semantic or text analysis techniques can be defeated. Because semantic technologies (ineffective on images) can be defeated and image recognition technologies limitations exploited, it becomes possible to secure the display of advertisements (i.e., advertisements enclosed in larger images are not detectable).

The invention further allows for generation of a video which captures and resembles what was intended to be displayed to the user. The video generation modifies the still original content and renders it in a video in a manner such that content filters will not be efficient when analyzing the modified video.

Another advantage of the invention is to provide remanence-based content and in particular to provide remanence-based advertisement.

Applications of embodiments of the present invention are numerous. Two main applications may be distinguished: static content such as web pages and dynamic content such as videos.

Firstly, web page content may be secured, by transforming static portions into videos. These videos are robust against content blockers. Web pages are refreshed at a pace depending on the users activity (user requesting a new web page for example). The method can then be applied continuously (video objects will be loaded instead of more simple initial objects). The transformation may be performed by a proxy server or locally on the client device.

Secondly, videos can be secured using particular embodiments of the invention. An initial video can be transformed into another (more secured) video, robust to content blockers or adblockers. Many videos today incorporate static logos (television channel logo for example) or transition pages for advertisement sequences. These elements are well known, are relatively static and occur at a given fixed area within the screen. They are scanned and detected by adblockers or content blockers. Such blockers or filters also detect keyframes (in order to classify the video). By modifying particular pages or frames or areas of interest within frames, embodiments of the invention secure the display of initial content. An initial video transformed into a secured video may be slightly visually altered. Embodiments of the present invention apply to classical video streaming (IPTV, VOD, internet portals, online TVs, etc.) and also to recorded video (played in DVD players, in set-top-boxes, multimedia hard drives, etc.).

Still another advantage of the invention is that it only requires a standard browser. It does not require any additional plug-in, components or local software on the client side. No additional software is required on top of the web browser, hence adoption can be immediate.

Further advantages of the invention will become clear to the skilled person upon examination of the drawings and detailed description. It is intended that any additional advantages be incorporated therein.

BRIEF DESCRIPTION OF THE DRAWINGS

Embodiments of the invention will now be described with reference to the following drawings.

To facilitate description, any numeral identifying an element in one figure will represent the same element in any other figure.

DETAILED DESCRIPTION OF THE INVENTION

The following text presents embodiments in the context of digital content and in particular of advertising content, but it is to be understood that it is not limited to this specific context or type of content. It extends equally to any type of content (such as disclaimers, warning notices, etc.). The content displayed by the generated program is intended to be any type of content such as a still image, video, 3D, music, sounds, interactive programs, etc., in any type of environment such as 2D display, 3D and immersive environments (virtual or augmented reality), for example. It is thus noted that advertisements are not solely involved. Embodiments of the invention address every situation where one or a plurality of particular areas (such as text or graphics) needs to be secured (need for preserving the integrity of the original display data as much as possible, even if the visual rendering is just being approximately preserved for an average user).

Figure 1:
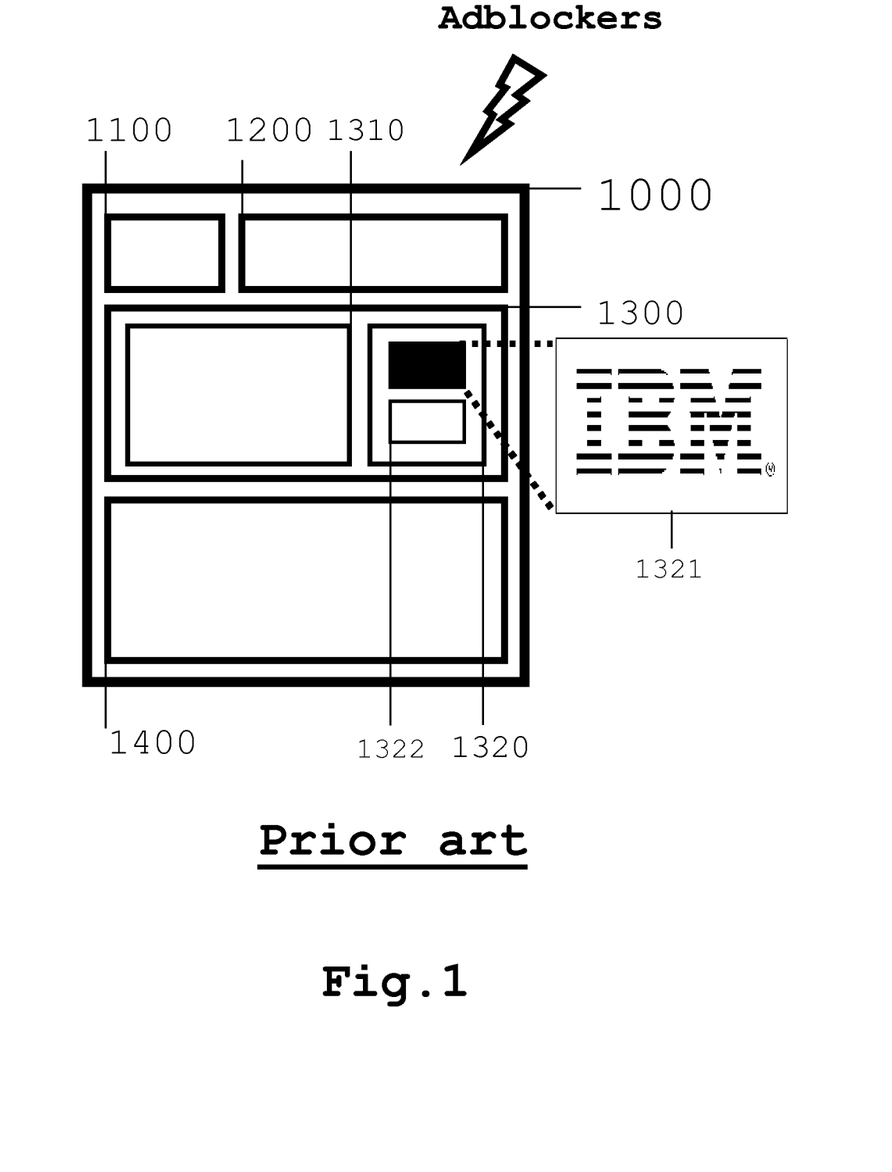
FIG. 1 illustrates an example of the DOM structure of a digital document.

FIG. 1 illustrates an example of the DOM structure of a digital document.

FIG. 1 highlights an exemplary DOM structure of a master digital content (of a markup file such as a web page for example). A plurality of nodes is shown, including node 1321, which comprises an advertisement. This node (or nodes containing the node) will be modified according to certain embodiments of the invention.

The "DOM" expression is to be understood as a way to refer to a (or the) logical structure of a digital document. This expression can thus be replaced by expressions such as "logical structure" or "hierarchical structure" or "structure". The so-called DOM (Document Object Model) is a way to refer to elements (such as XML or HTML) as objects. It is a platform-independent and language-independent standard object model for representing HTML or XML and related formats. The logical structure of the document is thus defined with the so-called DOM tree. The parts of the DOM tree are known as nodes. To obtain the DOM tree of a markup file, a markup file parser is used. Indeed, a parser loads the document into a computer's memory. Once the document is loaded, data of the document can be manipulated using the DOM, which treats the XML document as a tree. A DOM tree comprises a plurality of (parent and child) nodes. To obtain the DOM tree of a markup file, a markup file parser is used. Indeed, a parser loads the document into the computer's memory. Once the document is loaded, data of the document can be manipulated using the DOM, which treats the XML document as a tree.

It is noted that FIG. 1 only provides an example. DOM trees and related markup files can be much more complex. Nodes may be elements such as still images, animated images, Flash or Shockwave objects, videos objects, text areas, etc.

In a DOM tree, the top node is called the root. Every node, except the root, has exactly one parent node. A node can have any number of children. A leaf is a node with no children. Siblings are nodes with the same parent. Each node has a name, a value and a type (element, attribute, text, comment, document). From a given node, it is possible to obtain other related nodes (childNodes, parentNode, firstChild, lastChild, nextSibling, previousSibling).

In the exemplary tree of FIG. 1, the node 1000 is the root node. The nodes 1100, 1200, 1300, 1400 are child nodes of the root node 1000. The nodes 1310, 1320 are child nodes of node 1300. The nodes 1321, 1322 are child nodes of node 1320. The nodes 1100, 1200, 1300, 1400 are siblings nodes. The nodes 1310, 1320 are also siblings nodes. The nodes 1321, 1322 are siblings nodes.

The node 1321 comprises an advertisement (<IMG> node). This node will be modified according to certain embodiments of the invention.

Figure 2:
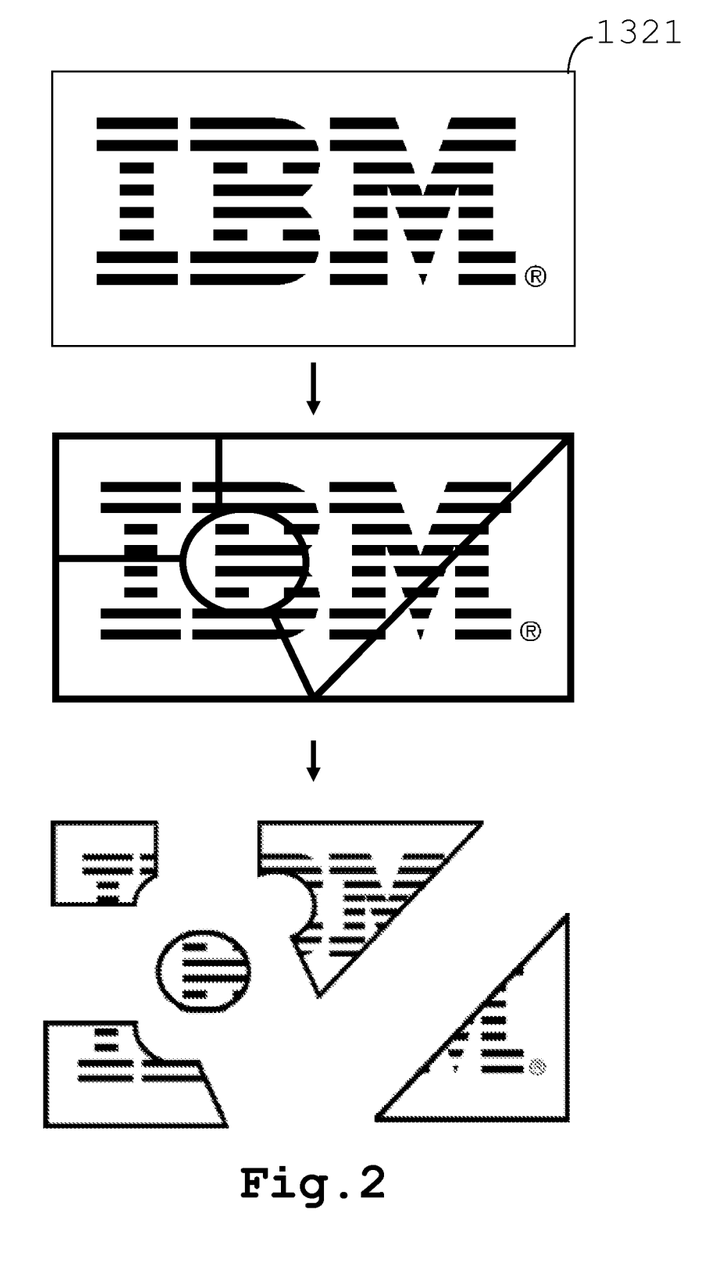
FIG. 2 illustrates a division of a master image in a plurality of sub-images.

FIG. 2 illustrates a division of a master image into a plurality of sub-images.

The master image is divided into a plurality of sub-images. For example, the content of the node 1321 is converted into such a master image (the document and DOM is interpreted and rendered to produce images).

The master image may exactly restitute the content of one or a plurality of Document Object Model (DOM) nodes of a digital content. The content is rendered and a screen or display capture is performed (snapshot, contents of the frame buffer of the graphics component, etc.). The master image may also only look like or resemble the content (there may be a visual similarity between original content and the master image).

In the example of FIG. 1, two nodes may be captured for instance. In other words, a set of child nodes whose displayable elements comprise a particular displayed area of interest may be identified in the DOM tree: the set of child nodes 1320, 1300 contains the advertisement image. A first parent node comprising at least one node of the set of child nodes is identified in the DOM tree: node 1320 (node 1320 is the parent node of nodes 1321 and 1322, while node 1320 is a child node of node 1300). Displayable elements associated with the first identified parent node 1320 are for example converted to a master image. A second parent node (not shown) comprising the master image is generated.

FIG. 2 shows a master image exposing a corporate logo, which is divided into one or a plurality of sub-images. In the example, the IBM company logo is divided in a complex manner. FIG. 2 only shows an example of such a division. Many other image divisions can be performed. The master image is divided into sub-images which subsequently may be altered (see FIG. 6).

An appropriate division of the master image is used to defeat content filters or adblockers that analyze still images or frames of videos. In particular the master image may be divided in order to minimize the likelihood of having at least one sub-image filtered by content filters analyzing the video. This likelihood is estimated by running one or a plurality of frame filters such as adblockers provided with image recognition capabilities.

As per the DOM structure, it may be useful to obtain a disposition of sub-images which does not correspond to (or duplicates) the original arrangement of DOM nodes or displayable elements. In other words, the mode of image division may benefit from the absence of duplication of the underlying DOM tree structure (by having non-concordant image mapping with the apparent display structure of the displayable elements of the digital content or markup file). This reinforces the robustness of the proposed method and system against adblocking (or filtering) techniques.

As a result of the image division step, there is obtained a plurality of sub-images (overlapping or not).

Figure 3:
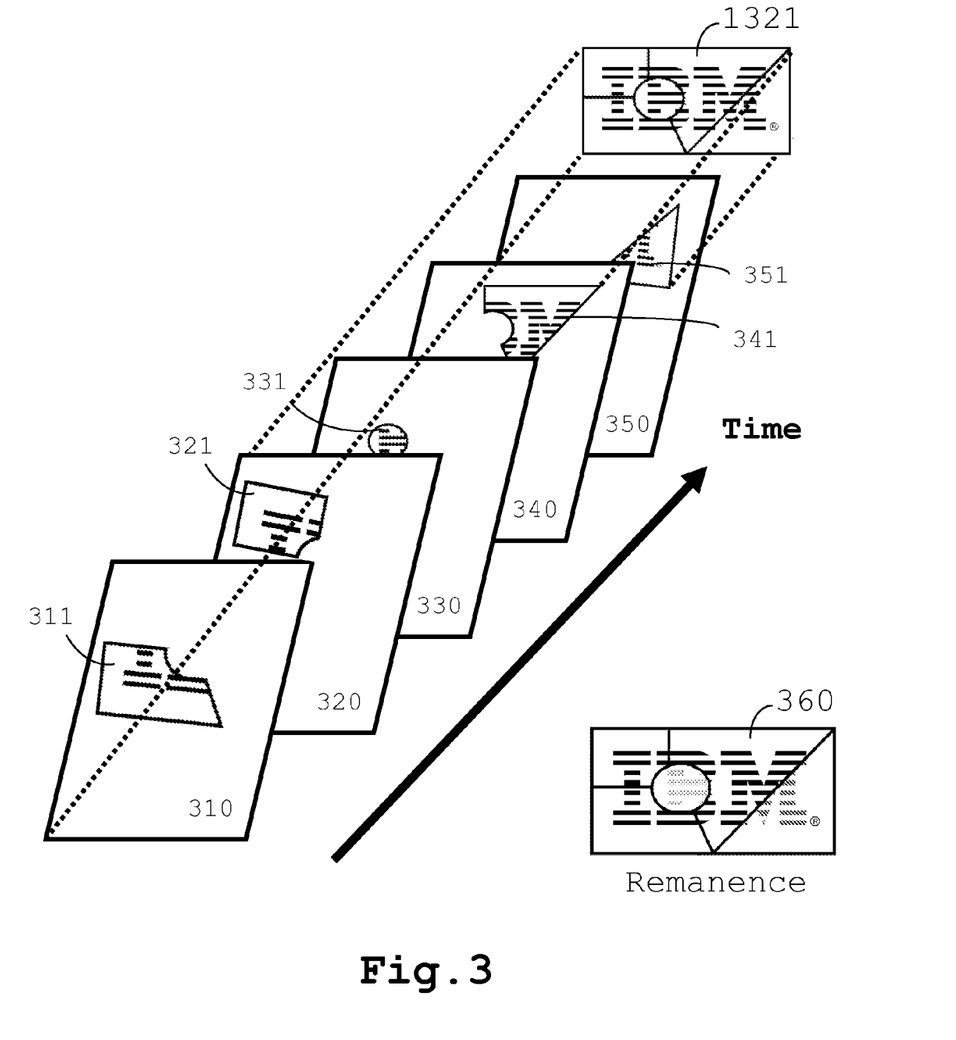
FIG. 3 illustrates the generation of a master video.

FIG. 3 illustrates the generation of a master video.

Provided the sub-images (altered or not), a video is generated.

FIG. 3 illustrates a first approach of the method.

In an embodiment, the dimensions of frames of the video are the same as those of the initial master image. According to other embodiments, these dimensions can be larger or smaller (scaling or cropping operations). FIG. 3 shows an exemplary distribution of the sub-images over such video frames. There is inserted at least one sub-image of a first plurality of sub-images in at least one video frame of a second plurality of video frames, so that the playing of a master video comprising the second plurality of video frames visually renders the master image. In other words there may be n sub-images and m video frames with n<m. Some video frames may not comprise any sub-image. A video frame may comprise more than one sub-image. The insertion of sub-image in each of the video frame is performed in a manner that it approximately respects the spatial arrangement of the initial master image; when played, the video visually renders the master image. In yet other words, the (orthogonal) projection of inserted sub-images in video frames reconstitutes the master image. There may be some overlaps (the concordance may not be exact). In other words, there may be "gaps", the concordance may not be perfect.

FIG. 3 illustrates such video generation. In FIG. 3, there is shown a master image, sub-images, and video frames. The sub-images 311, 321, 331, 341, and 351 of the master image 1321 are inserted in video frames 310, 320, 330, 340 and 350. The relative spatial positions are respected or maintained. The projection of sub-images restitutes the initial master image 1321.

The effect of such a video generation from a still image leverages image recognition limitations. It appears that it is difficult to detect an advertisement image inserted in a larger image (a logo in a large image for example). Increased CPU performances and increased image recognition techniques will sooner or later enable efficient pattern matching. Embodiments of the present invention go a step further and fragment or distribute the pattern over frames. According to certain embodiments of the present invention, the advertisement is fragmented into pieces and the display of these pieces is spaced over space and time. Content blockers scanning video frames will be inefficient and will not block content. Thus, the blue color of the IBM logo will not be sufficient for adblockers to decide to block the content because the logo form is not recognized. Image matching or image similarity algorithms are likely to fail when trying to detect known patterns or reference images.

Certain embodiments of the invention thus leverage a video remanence effect, based on appropriate image splitting. Good perception of images by the human eye looking at a screen, depends on many parameters, mainly the exposition duration of each image, the brightness and contrast of the images, and the degree of variation between two successive images. The remanence effect can be defined as a combined physiological effect involving the eye (retina persistence) and the brain (image interpretation). The retina persistence is the relative "inertia" of the retina cells that keep for a short instant the trace of received light. During this time, the light information is continuously sent to the brain to be interpreted. Remanence represents in fact the last 120 to 125 ms of information received by the retina cells interpreted by the brain.

If the remanence is imperfectly conducted, there may appear artifacts or flickering areas, such as illustrated on image 360 (levels of grey). Due to particular insertions of sub-images in video frames, of under or over repetitions of sub-images, when playing the master video, some regions may appear during too short durations to reach the remanence effect (light grey to dark grey if the initial image was in black and white; pale or dark color if in color). Such flickering effects or artifacts may be acceptable.

Figure 4:
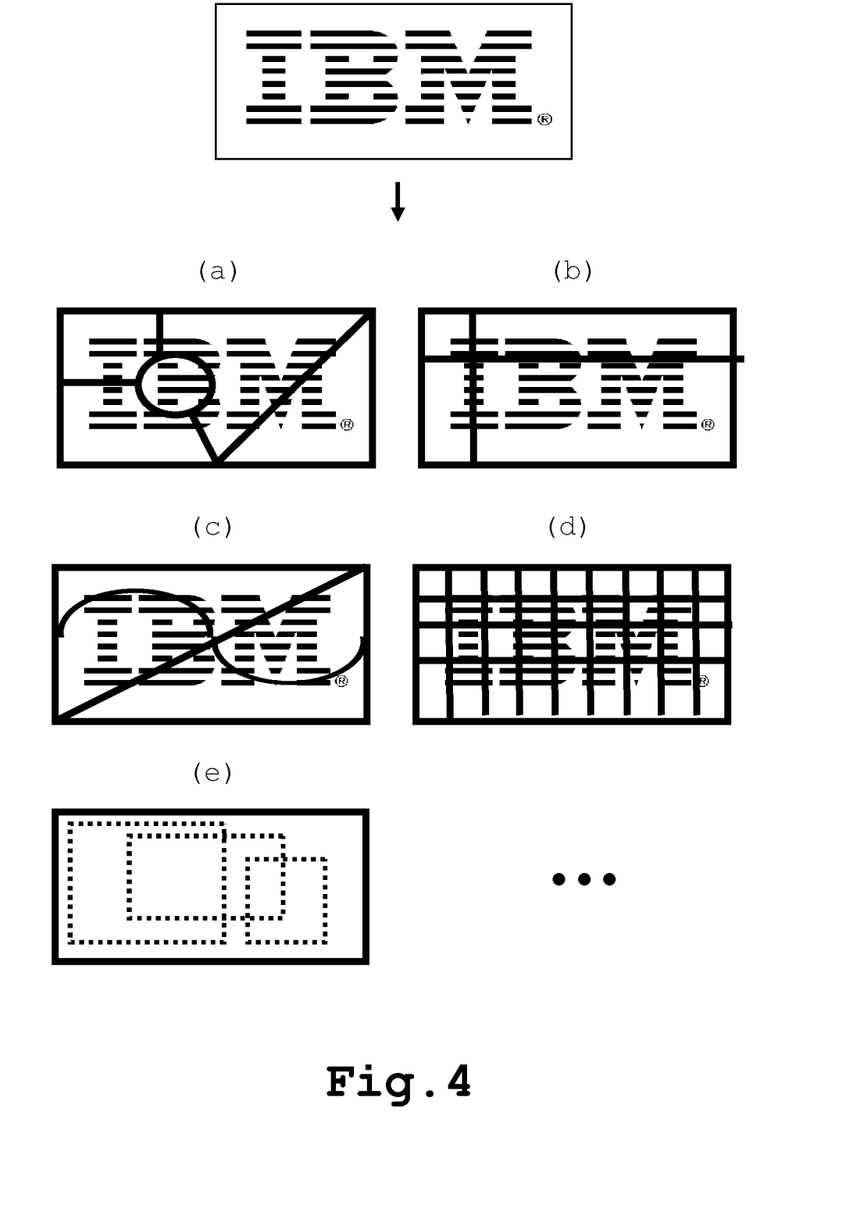
FIG. 4 illustrates alternative embodiments for a master image division.

FIG. 4 illustrates alternative embodiments for a master image division.

FIG. 4 shows examples of various image division modes. A corporate logo is divided into a plurality of sub-images. Five examples are provided but it is noted that an infinite number of other modes are possible, some particular modes presenting interesting properties regarding the balance between visual aspect for the user and efficiency against content blockers. In mode (a) the image is divided in a complex manner, with no respect for edges of the content of the image. The division may optimize the color repartition between sub-images (image indexation often precedes by color spectrum analysis). In mode (b) the division is simple, and thus fast and easy to achieve. The dimensions or surfaces of the sub-images are very different. In mode (c) the division operates according to curved limitations, illustrating that the divisions may not be limited to simple linear frontiers. Any form can be used. Mode (d) illustrates that a very high number of sub-images can be generated (further weighing or recurrences of specific sub-images may be determined). Mode (e) illustrates that sub-images may comprise overlaps (the intersection between any two sub-images may be not empty). The preceding modes present images with no overlap.

It is observed that the master image may capture or restitute text, not necessarily and not only visual content such as drawings or images. In an embodiment, the master image "freezes" any arbitrary part of a digital content (e.g., it may comprise the application menu, texts, images, drawings, control buttons; or a combination thereof).

The form of the sub-images or pieces may then vary as illustrated in FIG. 4. A compromise may be found between several parameters. Parameters can include, for example: likelihood of detection of the considered sub-image within the video frame, likelihood of filtering of the entire video, processing power, edge points or specific visual characteristics of the content of the master image to be divided, readability for the user (areas comprising texts may require particular modifications), optimization of a further possible flickering effect, etc.

The image division can involve random parameters (ever-changing and complex mapping). The image division may take into account the visual features of the content of the image. For example, the background of the corporate logo may be less divided or much or less altered than letters of the logo, the first letter "I" as well as the third letter "M" may not be altered or less altered than the letter "B" in between; a user in average recognizing the logo at first sight. More refined criteria may be defined regarding certain edges or lines to be preserved in preference to other ones, according to preferred or authorized or limitations of flickering effects, etc.).

Figure 5:
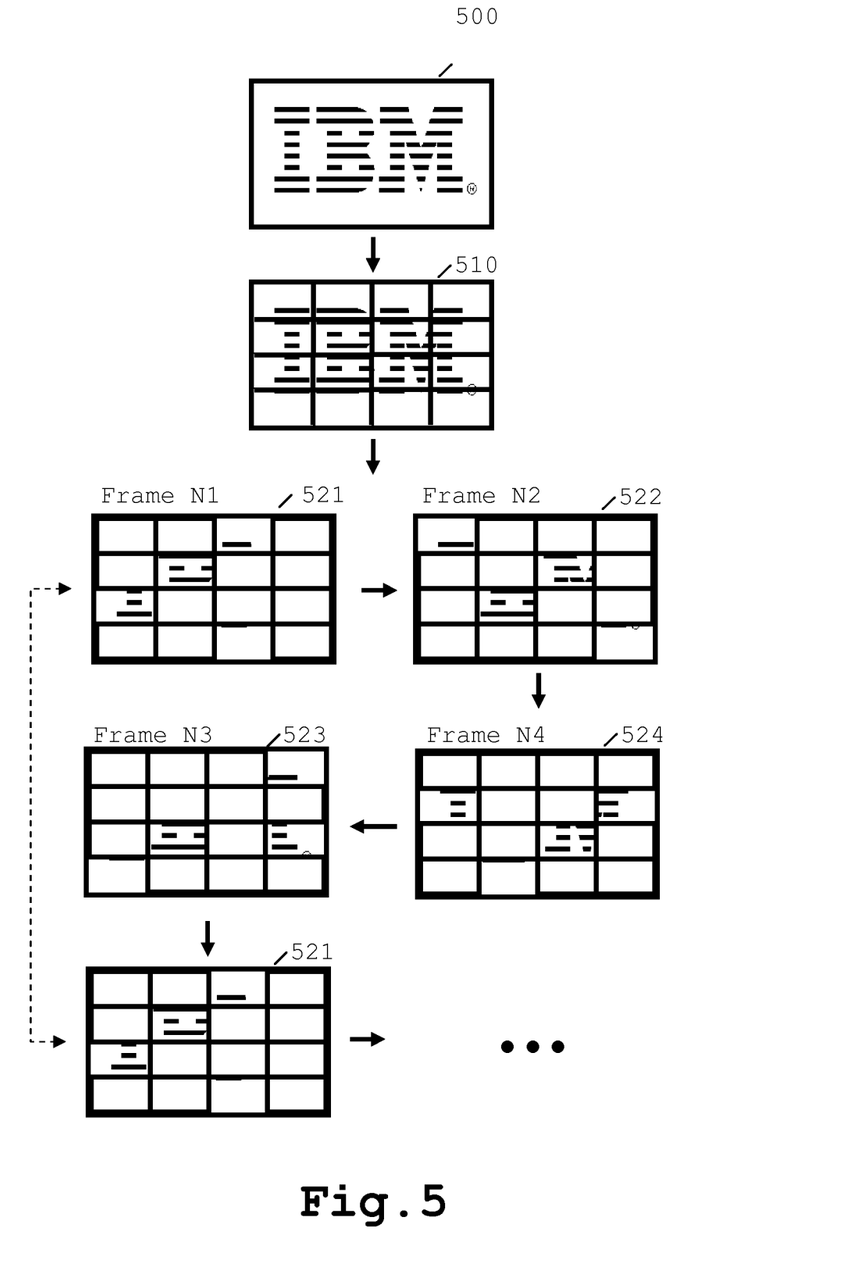
FIG. 5 details a particular image division.

FIG. 5 details a particular image division.

The division mode is chosen given the visual properties of the considered company logo.

An original master image 500 is split into 16 sub-images 510 (according to a regular division pattern). Four frames 521, 522, 523 and 524 are generated and played with each inserted in every successive frame.

Figure 6:
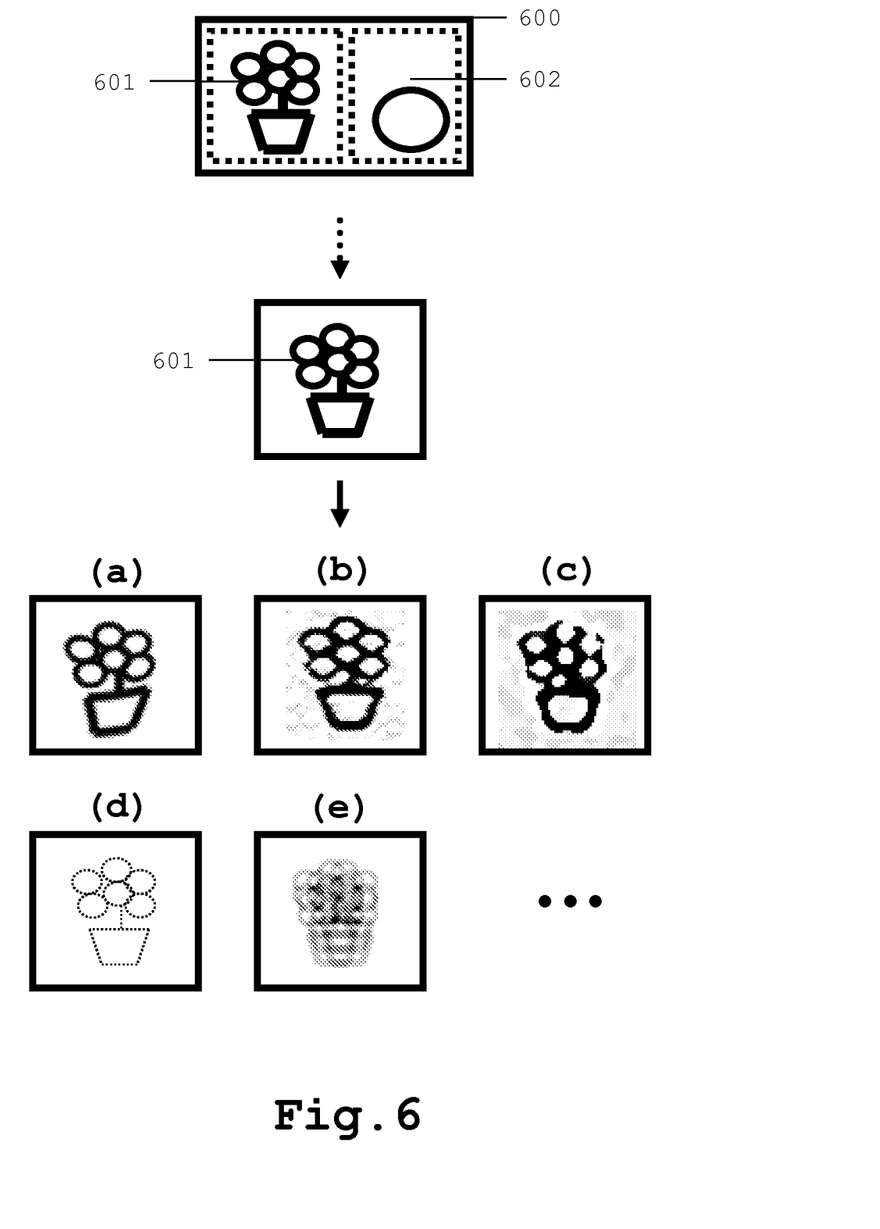
FIG. 6 illustrates optional further image alterations.

FIG. 6 illustrates optional further image alterations.

Sub-images may be selectively modified or altered to reinforce the robustness against content filters.

FIG. 6 shows a master image 600, two sub-images 601 and 602 and several examples of optional image alterations. The master image 600 is divided in two sub-images. In the example, the sub-image 601 is altered while the sub-image 602 is left unchanged. In example (a) the sub-image is distorted. In example (b) and (c) the sub-image is scrambled. In example (d), contrast has been modified while in example (e) noise has been added.

Any modifications such as photometric or geometric modifications can be brought to the sub-image (modulo particular treatments for text areas). Images may be modified or altered by operations such as convolution operations, morphological operations, geometric operations, histogram operations, alpha compositing operations, etc. Any image or sub-image can be cropped, blurred, transformed into a black and white image, distorted, etc. Noise can also be added. It is underlined that described operations (such as resizing, divisioning, splitting, partitioning, gathering, grouping, distorting, noising, discretizing, resampling, scrambling, greyscaling, etc.) on the image or sub-images derived from the displayable elements of the markup file can be taken in combination and according to different ponderations.

The entire master image or at least one of the sub-images can be altered by operations such as distorting, greyscaling, reencoding, resizing, noising, discretizing, resampling or scrambling (the list being not exhaustive). In other words a video generated according to certain embodiments of the present invention may comprise a combination of a certain number of unmodified sub-images and another number of altered sub-images.

The effect of alterations may be to contribute to defeat text analysis tools (semantics, OCR, etc.) as well as image recognition tools (pattern matching, image similarity matching, edge points, etc.). The described operations indeed reinforce the robustness against possible adblocking techniques.

Figure 7:
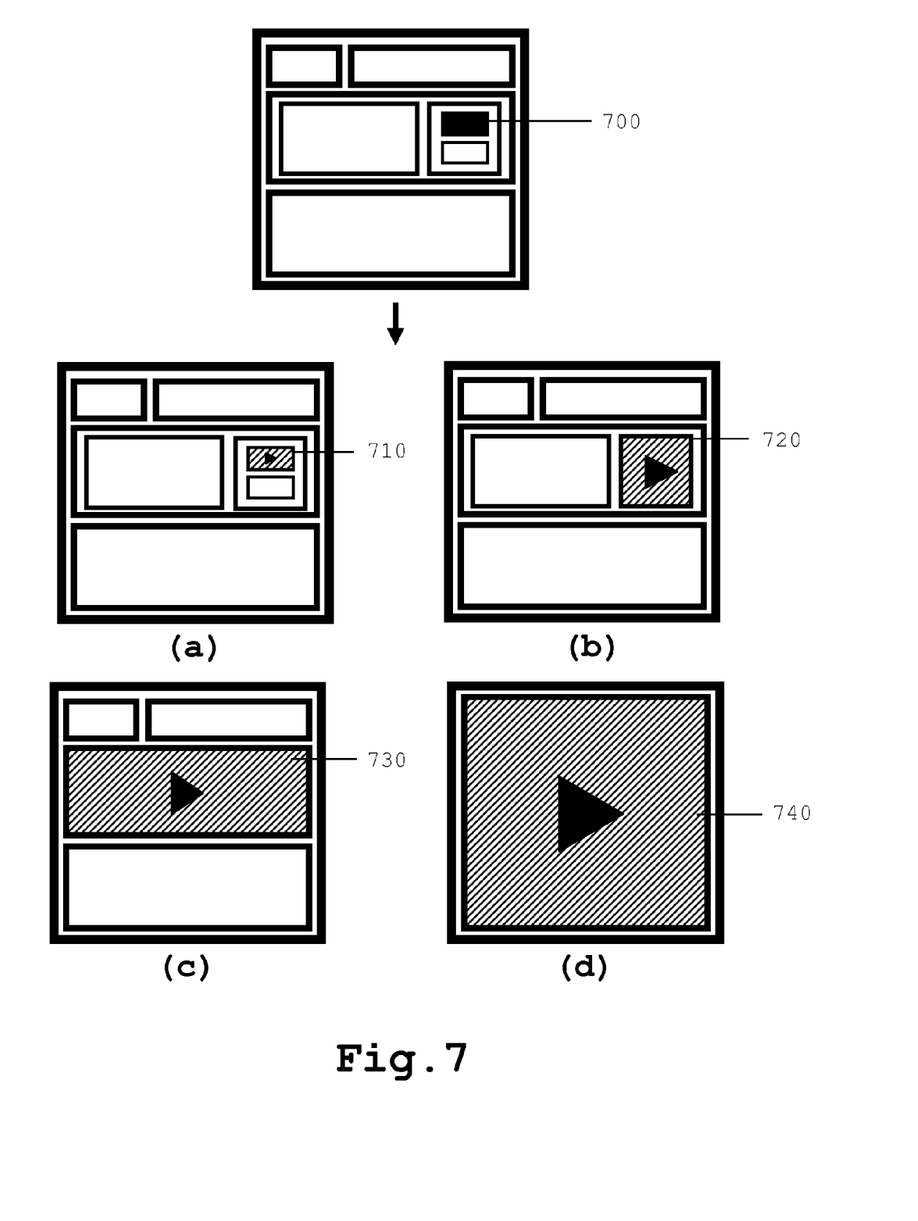
FIG. 7 shows different exemplary usages of the master video.

FIG. 7 shows different examples of use of the generated video.

Out of the preceding steps, a video is obtained from a master image, which video comprises sub-images distributed over frames, some of the sub-images having been much or less altered; and which master image captures or looks like an arbitrary part of a user interface.

FIG. 7 illustrates how the video generated according to embodiments of the invention can be used, and in particular examples of a video replacing one or a plurality of DOM nodes.

According to certain embodiments of the present invention, the obtained video is used or reused in the original digital content, from where the master image was extracted. FIG. 7 shows a web page and its associated DOM nodes. An original web page comprises a node 700 which is an advertisement or a particular area of interest whose display is to be secured. In the example (a), the <IMG> node is replaced by a modified node comprising a video according to embodiments of the present invention. In example (b) two nodes are "frozen" or replaced or captured by such a video. In example (c) a much larger surface is replaced. While in example (d) the entire web page in transformed in "video mode". As shown, each video is symbolized by a black triangle ("play" button). This symbol is used for the sake of clarity only and should not be seen as a limitation. Generated videos may be played in loop (or not), may be in "autoplay" (or not), may be responsive to user actions (or not) or browser add-ons (or not) or other videos (or not), etc.

Accordingly, the DOM tree is modified. Some child nodes are deleted and replaced by a generated parent node comprising the video object (which is or calls a video player adapted to play to generated video). Methods such as "replace Child( )" and/or the "nodeValue" property and/or "replaceData( )" and/or "setAttribute( )" etc) can be used to retrieve, replace or append data in a node (or to modify an entire node). Such methods come up with many parameters enabling much flexibility, enabling to replace a first <X> element with a new <Y> element.

According to a certain embodiment, there is disclosed a method wherein the master image captures a given portion of a digital content (such as the contents of DOM nodes) and wherein the master video is inserted in the digital document in replacement of the portion of the digital document.

Figure 8:
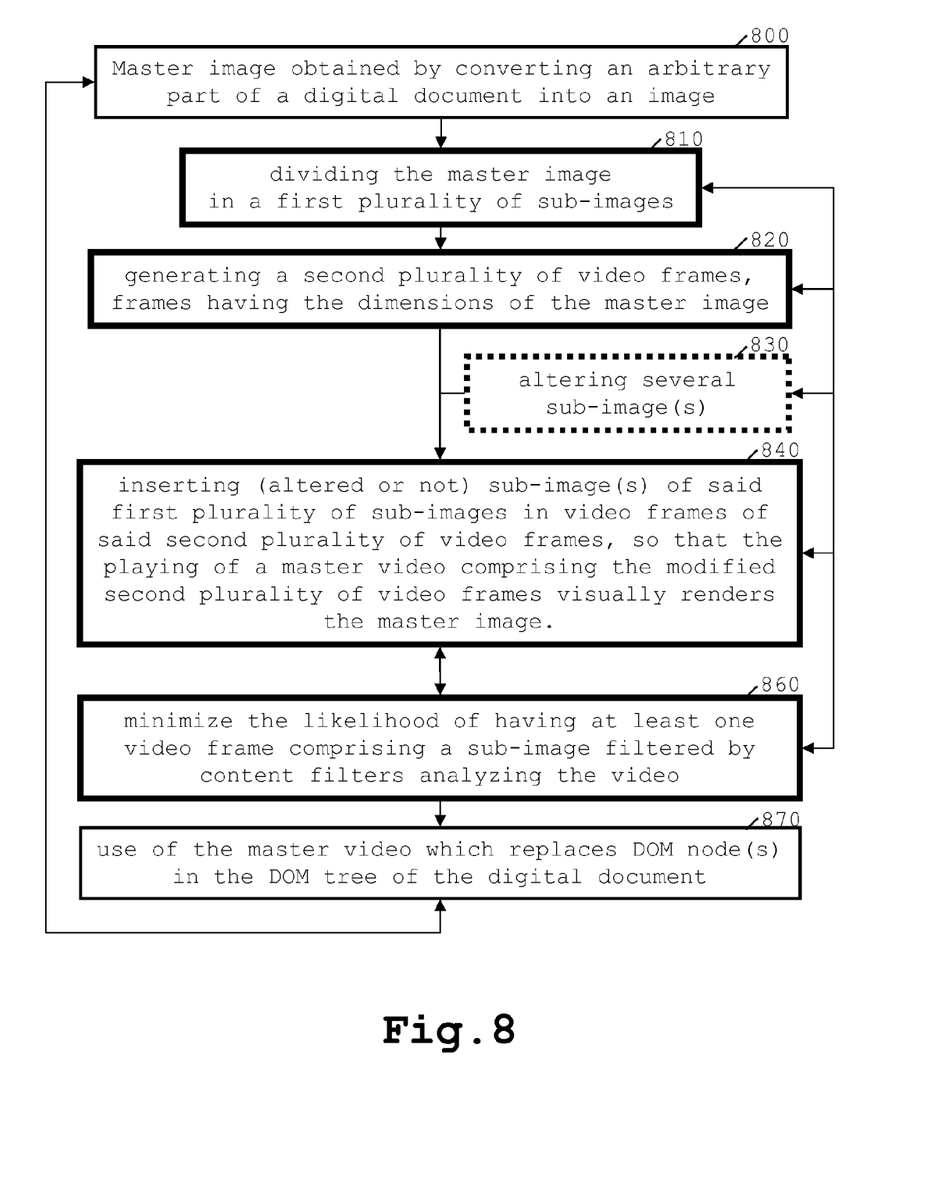
FIG. 8 shows a workflow of the method.

FIG. 8 shows a workflow of the method.

At 800, a master image is obtained by converting an arbitrary part of a digital document into an image. At 810, the master image is divided into a first plurality of sub-images. At 820, a second plurality of video frames is generated, the frames having the dimensions of the master image. At optional 830, the master image or sub-image(s) are altered. At 840, at least one the (altered) sub-image of the first plurality of sub-images is inserted in at least one video frame of the second plurality of video frames, so that the playing of a master video comprising the second plurality of video frames visually renders the master image.

Two alternatives are now discussed. Either the master video restitutes the contents of DOM node(s) in an image matching context or the master video resembles the contents of DOM node(s) in an image similarity context. Image matching compares different versions of the same image (modified by different interpretation engines or modified by geometric or photometric transformations such as distorting, greyscaling, reencoding, resizing, noising, discretizing, resampling, scrambling, etc.). Image similarity comparisons occur when images are different but related in forms or shapes or colors. Semantics can be very different: an image of a fried egg and an image of a sunrise can be considered as being similar images. Embodiments of the invention consider both image matching and image similarity A further control is provided at 860, where the likelihood of having at least one sub-image filtered by content filters analyzing the video is minimized.

At 870, there is provided a contextual use: the master video replaces DOM node(s) in the DOM tree of the digital document.

For this purpose, the invention further provides a method of defining a particular displayed area of an interpreted markup file (a web page) including:
  obtaining the DOM tree of the interpreted markup file, the DOM tree comprising parent and child nodes, each node being associated with displayable elements;
  identifying in the DOM tree a set of child nodes whose displayable elements comprise the particular displayed area;
  identifying in the DOM tree a first parent node comprising the set of child nodes;
  converting displayable elements associated with the identified first parent node to a master image;
  dividing the master image, such as a logo or an advertisement, into a plurality of sub-images;
  generating a plurality of video frames defining a master video, the video frames having the dimensions of the master image;
  inserting the plurality of sub-images into the plurality of video frames, such that the playing of the master video defined by the video frames visually renders the master image;
  generating a second parent node comprising the master video; and
  modifying the DOM tree into a modified DOM tree by deleting the identified set of child nodes and by replacing the identified first parent node by the second parent node.

The method also may be used to secure videos and for example to selectively secure the display of advertisements on web browsers. When the master image is a given frame of a given video, or a portion of the given frame, it becomes possible to circumvent content filters. The sub-images of the given frame are inserted in video frames of a master video which is inserted in the given video. Additional frames are inserted in other words. To secure a portion of a frame, a set of sub-images is generated. Video frames of the initial video will be mostly unchanged, except in and for the considered portion of the video frame.

Figure 9:
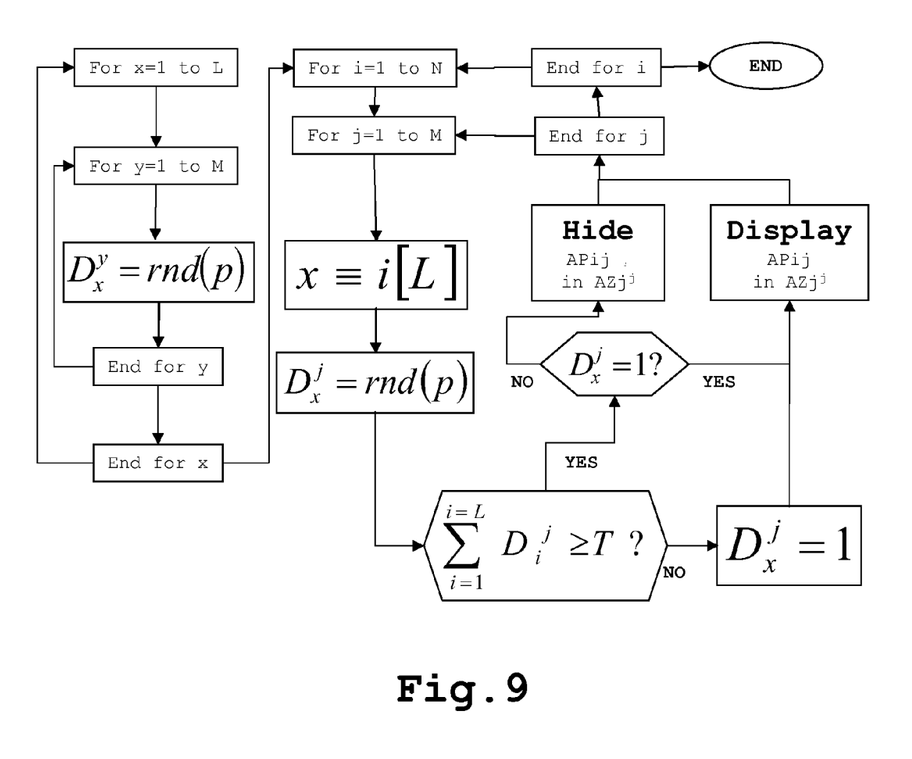
FIG. 9 details a probabilistic model of the method.

FIG. 9 details a probabilistic model of the method.

The advertisement is assumed to be confined within an Advertisement Zone, or AZ for short. This corresponds to the master image. The AZ is divided into Advertisement Pieces, or APs for short. These correspond to sub-images. Instead of having each AP present in each video frame, each AP is present in a given video frame with a probability p.

The probability p is adjusted so that the image remanence remains statistically above a pre-defined "comfort" threshold.

For each AP, a remanence controller ensures that the comfort threshold is always met, typically after a long sequence of "non-display" cases.

FIG. 9 shows a possible algorithm. Particular notations are now explained. The advertisement is displayed as a sequence of N AZ: AZi, i=1 to N, where the index "i" relates to the time scale. Each AZi is split into M AP's: AZi={APij}, j=1 to M, where the index "j" relates to the spatial scale. Each APj is associated with a vector Dj of length L: Dj=[Dij], i=1 to L; Dxj is equal to 1 if the last APij was displayed, with i=x[L]. Rnd(p) is equal to 1 with probability p.

The result is that in the advertisement never appears in its entirety in any video frames, impeding the adblocker to function properly. At the same time, the user still can see the advertisement thanks to the remanence effect.

The number of APs (sub-images) per AZ (video frames) is now discussed. There may be an optimal set of numbers. The number of APs (sub-images) per AZ (video frame) and the shapes of the APs (sub-images) may be chosen to increase the difficulty for the add blocker to operate. The maximum number of APs (sub-images) in a given AZ (video frame) can be split into, depends on the streaming flow speed (number of frames per second, noted fps) and depends on the number of APs (sub-images) included in each video frame. According to some embodiments, it may be interesting to maximize the number of APs (sub-images) per AZ (video frame) and following to insert several APs (sub-images) in every frame. The repetition will produce no flickering effect which is likely to occur when different complimentary sub-images are rendered alternately.

In other words, if F is the number of video frames per second and if the remanence effect is reached starting from above a frequency of 1/R (R images per second, with R<F), then in a given time frame, the display rate must reach this limit. The length of vector Dj corresponds to this time limit; it must be ensured to remain superior to the remanence threshold $T=L*R/F$.

It is noted that it is possible to NOT reach or obtain the remanence effect: the video will present flickering effects or other artifacts but the result will still be efficient and robust against adblockers. Having degraded video rendering may be perfectly acceptable. No limitations for this reason should be brought to the scope of the present disclosure. In other words, the master video generated according to embodiments of the present invention may or not leverage remanence effects. The visual impression may be smooth and perfect. It may also present defects.

A example is now considered. Considering a master image having brightness and contrast which are set to normal screen watching conditions, and further considering that the remanence is in the range of 120 to 125 ms, it can be concluded that each sub-image of the master image must be repeated at least every 125 ms to appear clearly to the viewer. That is, each sub-image requires (with a good probability) 1/0.125=8 images per second. With a streaming flow of 32 images per second, a master image may be composed of 32/8=4 sub-images, assuming only one of the 4 sub-images of the master image is played with each video image. In other words, with a frequency of 32 frames per second (fps), an AZ may be split into 16 APs and 4 non-adjacent APs may be played with every video frame in order to have each AP repeated (with a good probability) at least every (or around) 0.125 second as required for a satisfactory rendering. Reference can be made to FIG. 4 (in which example, the probability p of appearance of each AP has been locked to the values 0 or 1).

According a further embodiment of the method, a sub-image is further associated with a probability of display, this probability being adjusted to maintain the display of the master video above a predefined threshold for image remanence.

Figure 10:
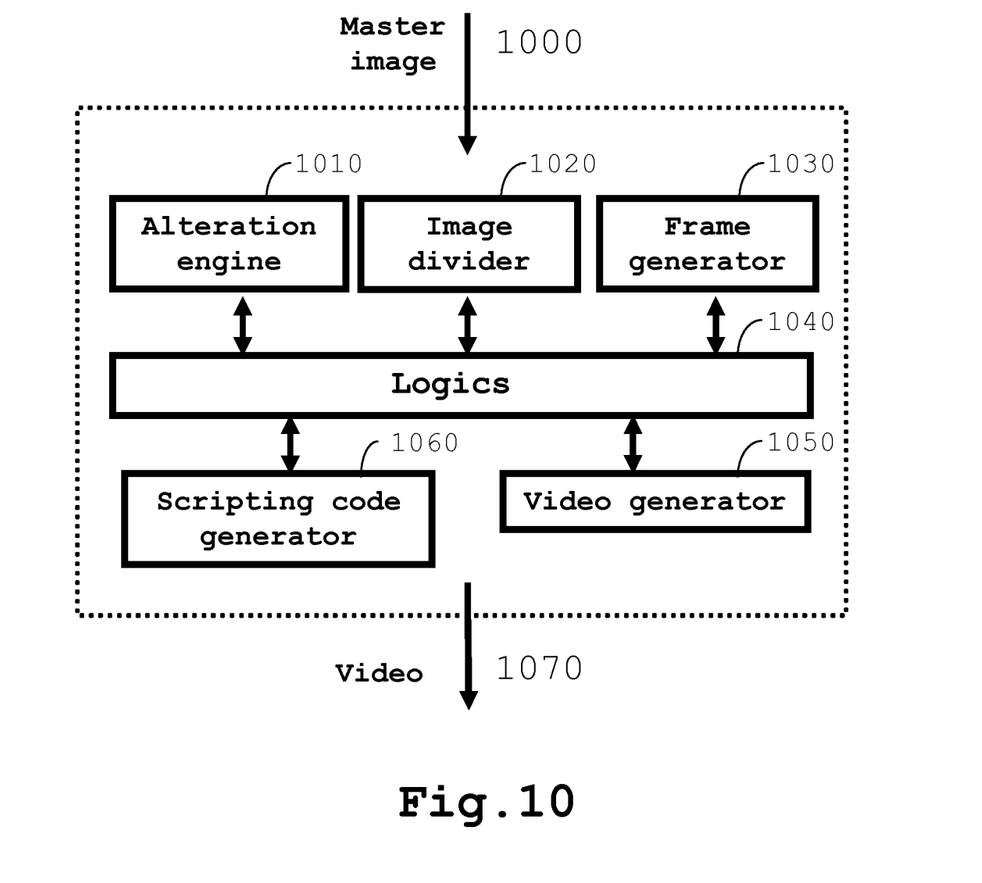
FIG. 10 illustrates a system view.

FIG. 10 shows a master image 1000, an image alteration engine 1010, an image divider 1020, a frame generator 1030, logic 1040, a video generator 1050, a scripting code generator 1060, and a video 1070.

A master image 1000 is received and divided in a plurality of sub-images by the image divider 1020 (according embodiments of FIG. 4). Some of the sub-images are altered by the image alteration engine 1010 (according embodiments of FIG. 6). Video frames are generated by the frame generator 1030. The three components are controlled by a logic 1040 which is interacting with databases and other programs (not shown) to help decide the number and form of sub-images, which sub-images require a modification and at what point. In particular, it may be interacting with a range of content filters (not shown) in order to estimate the best compromises of divisions and optional alterations, as well as the scaling factor to adjust the size of the video frames. It may also request user profiling data or special databases about visual features and best practices. The logic also drives the insertion and fusion of sub-images in generated video frames. It determines how much generated frames will be generated, which frames will contain no, one or more sub-image(s). As a result, a video is obtained.

Software code may also be obtained (from scripting code generator 1060, which is also interacting with the logic 1040), to be added in modified digital content or markup file. The software code may be scripting language code which is adapted to cause a user terminal upon which it is executed to transmit coordinate information defining the position of a user-controlled cursor. In addition, the scripting language code may be further adapted to cause a user terminal upon which it is executed to transmit action information defining a clicking action of a user-controlled cursor. The code may also encode the relative positions of sub-images having been generated (if a plurality of sub-images has been rendered). The code may serve to maintain the user interactivity. The code may also modify or add a new interactivity: the interactivity may remain possible for some areas and can be forbidden (not existing) for other specific areas. This further option is very valuable because of the control it offers over the user interactivity. Links, buttons, checkboxes etc., may be reencoded and controlled.

According to other embodiments of the invention, a video is obtained from a master image. The video comprises sub-images distributed over frames, some of the sub-images having been much or less altered. The master image captures or looks like an arbitrary part of a user interface. The video is associated with a software code which enables to maintain or modify the interactivity with the user compared to the initial arbitrary part of the considered user interface.

Readability scoring systems can help to perform the image division and alteration operations. Image alterations can be driven randomly or by rule decisions or decision logics (hardware or software implemented). Decision logic to perform such alterations may benefit from establishing databases of client browsers' profiles, from testing set of adblockers available on the market, from getting statistics about bandwidth and serving constraints, etc. Rating mechanisms (success of ads deliveries, statistics, etc.) can also be implemented (realtime or not). The reformatting of web pages would be rather variable than constant: each page may be reengineered before serving.

The invention can take the form of an entirely hardware embodiment, an entirely software embodiment or an embodiment containing both hardware and software elements. In an embodiment, the invention is implemented in software, which includes but is not limited to firmware, resident software, microcode, etc. running on at least one computer system. In particular it will be appreciated that the functionality of many of the components of the present invention may be implemented by means of software, hardware, or firmware of any combination of these. In a high performance computer system a hardware implementation of the java execution may prove advantageous for example.

Furthermore, the invention can take the form of a computer program product accessible from a computer-usable or computer-readable storage medium providing program code for use by or in connection with a computer system or any instruction execution system. For the purposes of this description, a computer-usable or computer readable storage medium can be any apparatus that can contain, store, communicate, or transport the program for use by or in connection with the instruction execution system, apparatus, or device.

IBM is a trademark of IBM Corporation. Other company, product or service names may be the trademarks or service marks of others.

The invention claimed is:

1. A method comprising:
employing a computer system for:
identifying a node associated with an image element in a document object model tree of a markup file;
converting the image element associated with the identified node into a master image;
dividing the master image into a plurality of sub-images;
generating a plurality of video frames defining a master video, the video frames having dimensions of the master image;
inserting the plurality of sub-images into the plurality of video frames, such that a playing of the master video defined by the video frames visually renders the master image; and
replacing the identified node of the document object model tree of the markup file with a node comprising the master video to obtain a modified document object model tree.

2. The method of claim 1, further comprising, before the inserting of the sub-images in the video frames:
altering at least one of the sub-images.

3. The method of claim 2, wherein the altering comprises an operation selected from the group consisting of distorting, greyscaling, reencoding, resizing, noising, discretizing, resampling and scrambling.

4. The method of claim 1, wherein the playing of the master video visually renders an image similar to the master image.

5. The method of claim 1, wherein the master image is divided in a manner such as to minimize a likelihood of having at least one sub-image filtered out by content filters analyzing the master video, the likelihood being estimated by running at least one content filter provided with image recognition capabilities.

6. The method of claim 1, wherein the master image is a given frame of a given video, and wherein sub-images of the given frame are inserted in video frames of the master video which is inserted in the given video.

7. The method of claim 1, wherein a scripting language code is generated and associated with the master video, and wherein the scripting language code is adapted to cause a user terminal upon which the scripting language code is executed to transmit coordinate information defining a position of a user-controlled cursor and/or to transmit action information defining a clicking action of the user-controlled cursor.

8. The method of claim 1, wherein a sub-image is further associated with a probability of display, and wherein the probability of display is adjusted to maintain the display of the master video above a predefined threshold for image remanence.

9. The method of claim 1, wherein the master image comprises an advertisement or a logo.

10. A computer program comprising instructions stored on a non-transitory computer readable storage medium for performing a method when executed by a computing device, the method comprising:
identifying a node associated with an image element in a document object model tree of a markup file;
converting the image element associated with the identified node into a master image;
dividing the master image into a plurality of sub-images;
generating a plurality of video frames defining a master video, the video frames having dimensions of the master image;
inserting the plurality of sub-images into the plurality of video frames, such that a playing of the master video defined by the video frames visually renders the master image; and
replacing the identified node of the document object model tree of the markup file with a node comprising the master video to obtain a modified document object model tree.

11. The computer program of claim 10, the method further comprising, before the inserting of the sub-images in the video frames:
altering at least one of the sub-images.

12. The computer program of claim 11, wherein the altering comprises an operation selected from the group consisting of distorting, greyscaling, reencoding, resizing, noising, discretizing, resampling and scrambling.

13. The computer program of claim 10, wherein the playing of the master video visually renders an image similar to the master image.

14. The computer program of claim 10, wherein the master image is divided in a manner such as to minimize a likelihood of having at least one sub-image filtered out by content filters analyzing the master video, the likelihood being estimated by running at least one content filter provided with image recognition capabilities.

15. The computer program of claim 10, wherein the master image is a given frame of a given video, and wherein sub-images of the given frame are inserted in video frames of the master video which is inserted in the given video.

16. The computer program of claim 10, wherein a scripting language code is generated and associated with the master video, and wherein the scripting language code is adapted to cause a user terminal upon which the scripting language code is executed to transmit coordinate information defining a position of a user-controlled cursor and/or to transmit action information defining a clicking action of the user-controlled cursor.

17. The computer program of claim 10, wherein a sub-image is further associated with a probability of display, and wherein the probability of display is adjusted to maintain the display of the master video above a predefined threshold for image remanence.

18. The computer program of claim 10, wherein the master image comprises an advertisement or a logo.

19. A system comprising:

at least one computer system, including:

a system for identifying a node associated with an image element in a document object model tree of a markup file;

a system for converting the image element associated with the identified node into a master image;

a system for dividing the master image into a plurality of sub-images;

a system for generating a plurality of video frames defining a master video, the video frames having dimensions of the master image;

a system for inserting the plurality of sub-images into the plurality of video frames, such that a playing of the master video defined by the video frames visually renders the master image; and a system for replacing the identified node of the document object model tree of the markup file with a node comprising the master video to obtain a modified document object model tree.

20. The system of claim 19, wherein the master image comprises an advertisement or a logo.

* * * * *